United States Patent [19]

Carter

[11] 4,171,211
[45] Oct. 16, 1979

[54] AIR FILTERING UNIT
[75] Inventor: Albert B. Carter, Louisville, Ky.
[73] Assignee: American Air Filter Company, Inc., Louisville, Ky.
[21] Appl. No.: 895,746
[22] Filed: Apr. 13, 1978
[51] Int. Cl.² .................................................. B01D 46/10
[52] U.S. Cl. ......................................... 55/493; 55/496; 55/502; 55/509
[58] Field of Search ................. 55/483, 493, 496, 502, 55/507–509, 422, 511, 513; 248/507, 509; 210/232, 415

[56] References Cited
U.S. PATENT DOCUMENTS

| | | | |
|---|---|---|---|
| 1,429,952 | 9/1922 | Kearney | 248/507 |
| 1,746,283 | 2/1930 | Reed et al. | 55/509 |
| 2,648,515 | 8/1953 | Weiss | 248/509 |
| 2,733,039 | 1/1956 | Balogh | 248/509 |
| 3,385,034 | 5/1968 | Farr | 55/502 |
| 3,460,322 | 8/1969 | Rivers et al. | 55/502 |
| 3,493,115 | 2/1970 | Koches | 55/502 |
| 4,021,212 | 5/1977 | Legler | 55/502 |
| 4,023,944 | 5/1977 | Beane | 55/493 |

Primary Examiner—David L. Lacey
Attorney, Agent, or Firm—Jon C. Winger

[57] ABSTRACT

An air filtering unit includes a generally rigid, affixed framework having an inwardly extending planar flange defining an opening. A box-like filter cartridge has a lower edge surface adapted to seat on the framework flange. Means are provided for securing the filter cartridge in position on the framework. Such securing means include at least two opposing adjustable fastening means, each of which includes an elongated strap attached to its lower end to an outer wall portion of the framework and extending outwardly a distance greater than the height of the filter cartridge. A bracket, having a slot which matches the strap so as to be slidable thereon, is mounted on the strap and adjustable means are mounted on the strap outwardly of the bracket and movable along the strap into forcing engagement with the bracket to urge the filter into engagement with the framework.

5 Claims, 5 Drawing Figures

U.S. Patent  Oct. 16, 1979  4,171,211
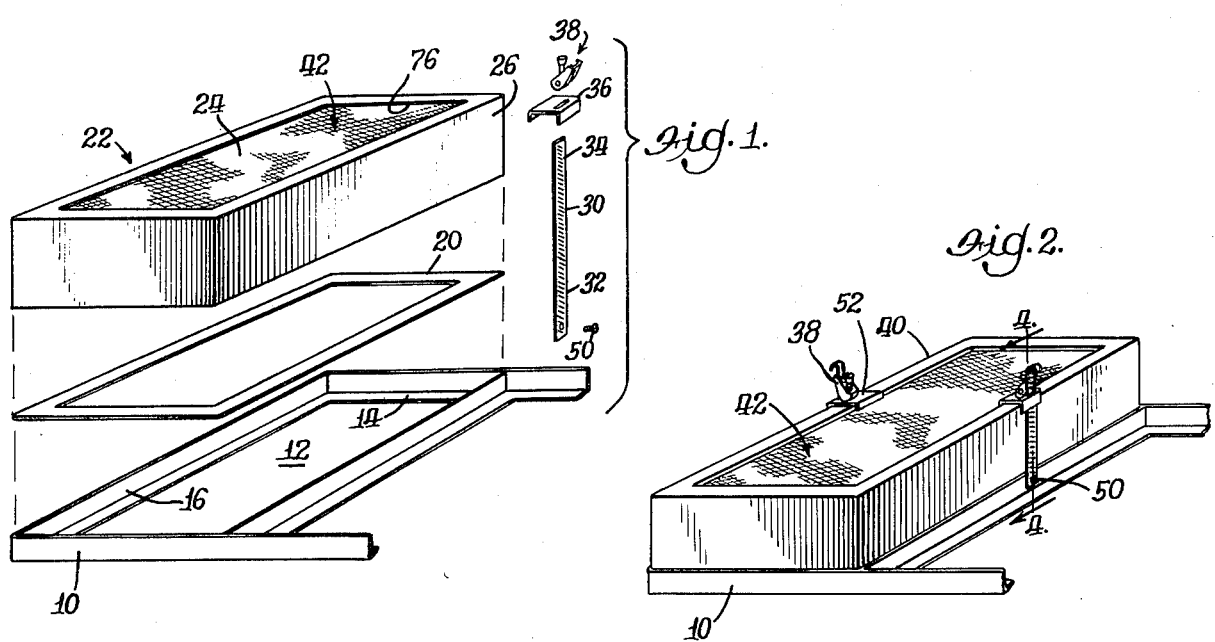
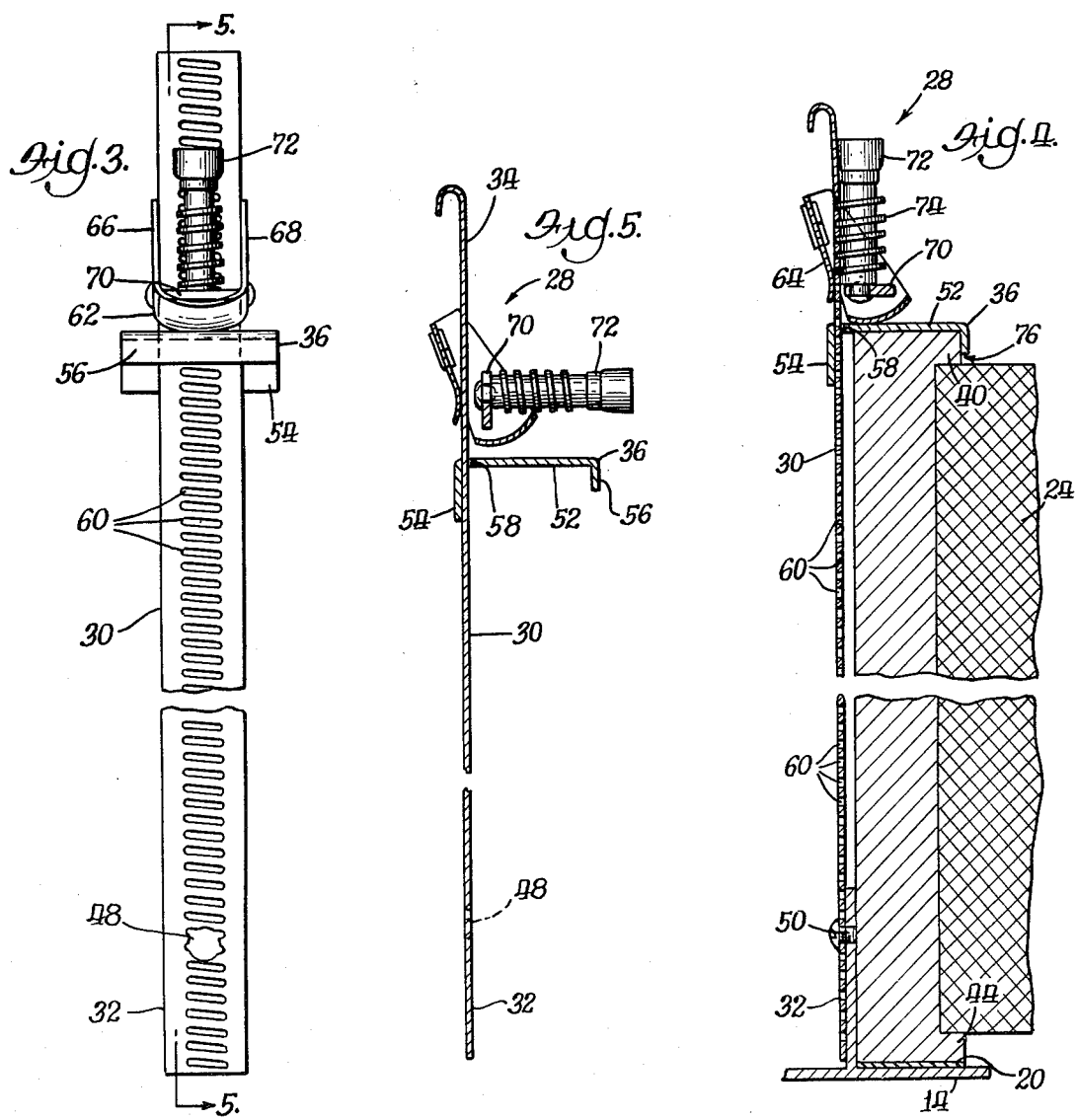

AIR FILTERING UNIT

DESCRIPTION

The present invention relates generally to air filtering units and more particularly to apparatus for securing an air filter cartridge in position on a supporting framework.

The control and/or elimination of particulate matter in the air which passes into, out of, or circulates within enclosed areas is an important goal, both from the standpoint of health and the fact that particulate matter can seriously impair many manufacturing processes and/or the environment. One method of controlling and/or eliminating particles from the air is to force air to pass through a suitable air filtering unit. For example, air filtering units are frequently provided for clean rooms, i.e., rooms requiring controlled environments.

Air filtering units generally include a fixed framework having a central opening or passageway and filter means, such as a filter cartridge, secured to the framework. Air is forced, as by means of a fan, to pass from one side of the framework to the other and through the filter cartridge. In order to prevent air from bypassing the filter cartridge, the cartridge is generally arranged so as to sealingly engage the frame. In order to provide a non-permanent, yet sealing, engagement between a filter cartridge and the frame, a gasket is generally included therebetween and various types of securing devices have been employed to secure the engagement between the filter cartridge and the frame.

In addition, as a natural result of the collection of particles, the filter cartridge eventually becomes clogged, losing its efficiency and thus requiring its removal for either cleaning or replacement. It is generally desirably for the securing means to be easily and quickly removable so that the filtering units are out of operation for as short a period of time as possible when the filter cartridges have to be cleaned or replaced.

A plurality of air filter cartridges are frequently arranged within a common framework, forming a bank, sometimes covering an entire wall or ceiling. In order to make most efficient use of the available space, the cartridges are desirably arranged as close as possible to one another within the bank. Thus, the securing means desirably occupy as little volume as is possible while providing the tensile strength necessary to support the filter cartridge.

Prior art filtering units have generally employed bolts, latches, hooks or similar means for securing the filter cartridge to the frame. Such securing means have generally required spacing the units from one another and are relatively large as compared to the tensile strength necessary to maintain the cartridges in position. Also, the bolts are generally threaded to receive a threaded nut. Thus, each bolt is usable for only one size filter, unless the threads extend over a substantial portion of the bolt. In such case, a nut must be threaded onto the bolt over a substantial distance. Thus, in addition to being bulky, the bolts are either incapable of being adjusted for varying filter needs or else their adjustability makes them unreasonably time-consuming.

Accordingly, it is an object of the present invention to provide an easily and quickly removable clamp for an air filtering unit. It is also an object to provide means for securing air filter cartridges to a framework to permit air filtering units to be placed in close proximity to one another.

It is a further object to provide securing means for air filtering units which are quickly adjustable over varying lengths. Other objects and advantages will become apparent from the detailed description, in conjunction with drawings, in which:

FIG. 1 is an exploded perspective view of an air filtering unit embodying various of the features of the present invention;

FIG. 2 is a perspective view of an air filtering unit embodying various of the features of the present invention;

FIG. 3 is a plan view of a clamp embodying various of the features of the present invention;

FIG. 4 is a view of a clamp taken along line 4—4 in FIG. 2; and

FIG. 5 is a view of a clamp taken along line 5—5 in FIG. 3, when the screw member is in the sliding position.

An air filtering unit in accordance with the present invention includes a flow-through filter cartridge which is secured to a generally rigid, preferably gas impervious supporting framework. The framework is rigidly attached to a building structure (not shown), in a position to control the air flow either into or out of a building or a room thereof. Preferably a gas impervious gasket sealingly engages the framework along a flange around the entire periphery of an opening defined by the flange. The filter cartridge, which includes a filter medium and a filter housing, is dimensioned so that one end slidingly fits within the sidewalls of the framework and seats on the flange. The filter housing is secured to the framework by securing means which comprise an elongated strap having a first end portion attached to the side wall of the support wall, a bracket slidably mounted on the strap to engage the upper wall of the housing and adjustable means mounted upon the strap to urge the bracket towards the secured first end portion of the strap.

Referring more particularly to the drawings, a framework 10, which normally attaches to a ceiling or wall, is formed from suitable structural members, such as T-bars and angle irons which are arranged to provide a support base or seat for one or more filter cartridges. The framework 10 provides a peripheral sleeve or side wall 16 and a transverse inwardly extending flange 14. The framework 10 is in flow communication, as by conduits, with a clean room, for example, on one side and an air source on the other. The framework 10 is formed from an essentially rigid, and preferably gas impervious material, such as 16 gauge steel or the like. The framework may be designed for supporting a plurality of adjacent filter cartridges.

A resilient gas impervious sealing gasket 20 is sealingly engaged to the framework 10 around the entire periphery of the framework opening 12. A suitable material for the sealing gasket is closed cell neoprene rubber which is adhesively bonded to the framework flange 14, as with epoxy adhesive.

A flow-through filter cartridge 22 comprises a housing 26 and a filter medium 24. The filter housing 26 comprises a generally rigid and preferably gas impervious material formed of any suitable material such as metal, plastic or wood. The housing 26 is generally rectangular in form and has an outer wall or walls which include an upper wall or edge 40 defining a first opening 42 and a lower wall or edge 44 defining a second opening. The filtering medium 24 is disposed between the housing first opening 42 and the housing second opening, essentially filling the volume defined by the housing 26. The medium may comprise a finely woven glass mat folded between aluminum separators in a pleated design. A face guard, comprising a wide mesh screen may be secured over each of the openings to insure that the medium remains in place during severe surging or reverse air flow through the medium. Satisfactory filter cartridges for use in accordance with the present invention are available, for example, from American Air Filter Company, Incorporated, of Louisville, Ky., under the registered trademark Duracel, which is a one piece cartridge type filter having a metallic frame and a pleated woven glass mat filter media.

The bottom wall or edge 44 of the housing sealingly engages the sealing gasket 20 around the entire periphery of the framework opening 12. Thus, air passing through the framework opening 12 must pass through the filter medium 24.

Securing the filter cartridge 22 to the framework 10 and gasket 20 is securing means 28 which includes an elongated strap 30, comprising an inelastic material such as steel. The strap 30 includes a first end portion 32 attached to the frame sidewall 16 and an opposite free end portion 34. The end portion 32 preferably includes an opening 48 adapted to receive a screw 50 or other means for securing the strap to the sidewall 16.

Slidably mounted upon the strap 30 is a bracket 36 comprising a horizontal body portion 52, and engaging means such as the sidewalls 54 and 56. Alternatively, the engaging means may for example comprise a suction cup attached to the lower face of the body portion 52. The sidewalls 54 and 56 are preferably generally parallel and spaced apart by a distance at least equal to the width of the upper horizontal edge 40 of the filter housing 26. An elongated aperture 58 is defined within the body portion 52 adjacent to and generally parallel to the sidewall 54 to receive the strap 30 therethrough. The dimensions and configuration of the aperture 58 are adapted to permit the strap 30 to be received therethrough for sliding movement of the bracket 36 longitudinally of the strap 30.

Adjustable means 38 are mounted on the strap 30 to urge the bracket 36 to a position of pressurized engagement with the filter housing and to insure compression of the gasket 20 between the framework flange 14 and the lower edge 44 of the housing.

In a preferred embodiment, a plurality of parallel, uniformly spaced, inclined adjusting slots 60 are defined within the strap 30. Preferably, the adjusting slots 60 are defined over essentially the entire length of the strap 30.

In one embodiment employing a steel strap approximately 45 centimeters in length and 1.5 centimeters in width, the adjusting slots 60 were about 1.0 millimeter by 7.0 millimeter and were spaced apart by a distance of about 1.5 millimeter.

The adjustable means 38 preferably includes a housing 62 comprising a base wall 64 and a pair of oppositely disposed sidewalls 66 and 68. A pivot member 70 is pivotally mounted between the sidewalls 66 and 68 and spaced from the base wall 64. An elongated screw member 72 is rotatably attached at its outer end to the pivot member 70, the longitudinal axis of rotation being generally perpendicular to the pivotal axis of the pivot member 70. The screw member 72 carries an integral helical thread 74. The pitch of the thread is generally equal to the distance between adjacent adjusting slots 60. Pivotal motion of the pivot member 70 carries the screw member 72 between a first position, in which the screw member is generally parallel to and closely adjacent to the strap 30 and the thread 74 enters a plurality of the slots 60 to permit only selective movement of the adjustable means 38 longitudinally along the strap 30 by rotating the screw member 72, and a second position in which the screw member 72 is generally perpendicular to and spaced from the strap 30 with the thread 74 disengaged from the slots 60 to permit free slidable movement of said adjustment means longitudinally of the straps 30.

A suitable adjusting means of the type described is available from the Ideal Corporation in Brooklyn, N.Y., sold under the designation SNAPLOCK. In use, each of a plurality of securing means 28 are used for securing each filter cartridge in position. For a relatively small rectangular filter cartridge 22, it may be sufficient to provide a pair of straps 30 at about the midpoint of each of two opposing sides. A gasket 20 is sealingly engaged to the framework flange 14 about the entire periphery of the opening 12 as by means of an epoxy adhesive. The filter cartridge 22 is positioned such that the lower edge 44 of the housing 26 seats on the gasket 20 around the entire periphery of the opening 12 and the free end portion of the strap extends beyond the upper or outer edge 40 of the housing. The bracket 36, which is freely slidably mounted on the strap, is slid toward the filter housing until the bracket 36 engages the upper edge 40 of the filter housing with bracket sidewalls extending along the sides of the filter housing.

The adjustable means 38, with the pivotal member 70 in the second position, is then slid along the strap until it engages the bracket body portion 52. The pivotal member 70 is then pivoted to the first position in which the thread 74 of the screw member 72 engages several of the slots 60. The adjustable means 38 is then urged against the bracket 36 by rotation of the screw member 72, such as by a screwdriver, until the filter housing lower edge 44 sealingly engages the gasket 20 around the entire periphery of the opening 12 and the gasket 20 is compressed between the filter cartridge housing lower edge 44 and the framework flange 14. For removal, the attachment steps are merely reversed. The upper end of the strap 30 can be curved back on itself, as shown in FIG. 5 to prevent the adjustable means 38 from sliding off the strap.

The strap 30 is attached to the sidewall 16 by means of a screw 50. Alternatively, the strap can be attached to the sidewall by riveting, welding, etc. If desired, the sidewall 16 can be provided with a slot and the outer end of the strap can be inserted through the slot and bent back on itself to lock the strap in position.

This construction makes it possible to store a single size strap, which is large enough to secure the largest contemplated cartridge to its associated frame. If the securing means is to be used in connection with a smaller filter cartridge, then immediately prior to use the strap is cut down to the appropriate length in the field.

Air filtering means in accordance with the present invention are extremely light in weight and permit arrangement closely adjacent to other units. A single clamp can be used for a variety of different sized filter housings without requiring substantial adjustment. The clamps are quickly and easily secured and detached.

Various modifications of the invention in addition to those shown and described herein will become apparent to those skilled in the art from the foregoing description and the accompanying drawings. Such modifications are intended to fall within the scope of the appended claims.

What is claimed is:

1. An air filtering unit including a generally rigid affixed framework having a planar flange defining an opening, a flow-through filter cartridge having a lower edge surface adapted to seat on said flange, and means for securing said filter cartridge in position on said framework with the lower edge of the cartridge in engagement with said framework, said securing means including at least two opposing adjustable fastening means, each said fastening means including an elongated strap having a plurality of equally spaced parallel slots and being attached at its lower end to an outer wall portion of said framework and extending outwardly a distance greater than the height of said filter cartridge, a bracket having an aperture therein which matches the cross-sectional configuration of said strap and is sized to receive said strap therethrough so that said bracket is freely slidable along said strap, and adjustable means mounted on said strap outwardly of said bracket, said adjustable means being movable to two positions relative to said strap such that when said adjustable means is in a first position it engages at least one of said slots of said strap to permit only selective movement of said adjustable means along said strap and when in a second position it is disengaged from said at least one slot of said strap to permit free slidable movement of said adjustable means along said strap, said adjustable means when in said second position being freely movable along said strap into engagement with said bracket and when in said first position being selectively movable along said strap to exert and maintain a force on said bracket against said filter cartridge to urge said filter cartridge into engagement with said framework.

2. An air filtering unit in accordance with claim 1, wherein said filter cartridge comprises a filter housing, and said bracket is generally U-shaped in cross-section and adapted for engagement with adjacent sides of an outer edge of said filter housing.

3. An air filtering unit in accordance with claim 1 in which a resilient sealing gasket is disposed between said frame flange and said filter cartridge.

4. An air filtering unit in accordance with claim 1 in which each of said slots are elongated, each slot being inclined with respect to the longitudinal axis of said strap and said adjustable means comprises a pivot member and a rotatable screw member rotatably attached to said pivot member so that when said pivot member is pivoted to a first position the axis of said screw member extends generally parallel to the strap, the pitch of the thread being such that the screw threads of said screw engage a plurality of said strap slots, whereby the adjustable means is selectively movable over the length of the strap upon rotation of the screw member.

5. An air filtering unit in accordance with claim 4 in which the pivot member is constructed and arranged such that when it is pivoted to a second position the axis of the screw member is generally perpendicular to the strap with its threads out of engagement with the previously engaged plurality of said strap slots, in which position the adjustable means is freely slidable along said strap.

* * * * *